(12) United States Patent
Thomas

(10) Patent No.: US 10,616,078 B1
(45) Date of Patent: Apr. 7, 2020

(54) DETECTING DEVIATING RESOURCES IN A VIRTUAL ENVIRONMENT

(71) Applicant: Amazon Technologies, Inc., Reno, NV (US)

(72) Inventor: Nathan Bartholomew Thomas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 204 days.

(21) Appl. No.: 14/221,067

(22) Filed: Mar. 20, 2014

(51) Int. Cl.
| | |
|---|---|
| *G06F 11/07* | (2006.01) |
| *G06F 15/177* | (2006.01) |
| *G06F 9/455* | (2018.01) |
| *G06Q 10/00* | (2012.01) |
| *H04L 12/26* | (2006.01) |

(52) U.S. Cl.
CPC .......... *H04L 43/04* (2013.01); *G06F 9/45558* (2013.01); *G06F 11/076* (2013.01); *G06F 11/0712* (2013.01); *G06F 11/0796* (2013.01); *G06F 2009/4557* (2013.01)

(58) Field of Classification Search
CPC .. G06F 11/0709; G06F 11/0769; G06F 11/30; G06F 11/34; G06F 2209/503; G06Q 10/0631; H04L 41/5003; H04L 43/08
See application file for complete search history.

(56) References Cited

U.S. PATENT DOCUMENTS

| | | | | |
|---|---|---|---|---|
| 2005/0246241 A1* | 11/2005 | Irizarry, Jr. | ............ | G06Q 10/00 705/26.1 |
| 2009/0144579 A1* | 6/2009 | Swanson | ............. | G06F 11/0712 714/3 |
| 2010/0070807 A1* | 3/2010 | Hamilton, II | ....... | G06F 11/0769 714/48 |
| 2010/0125565 A1* | 5/2010 | Burger | ............. | G06F 17/30433 707/713 |
| 2010/0262467 A1* | 10/2010 | Barnhill, Jr. | ........ | H04L 12/2809 709/223 |
| 2013/0060933 A1* | 3/2013 | Tung | .................... | G06F 11/3495 709/224 |
| 2013/0124712 A1* | 5/2013 | Parker | ................. | H04L 41/5038 709/224 |
| 2014/0113588 A1* | 4/2014 | Chekina | ................ | G06F 21/552 455/410 |
| 2014/0258446 A1* | 9/2014 | Bursell | ................. | G06F 15/177 709/217 |
| 2015/0128265 A1* | 5/2015 | Jover | ................. | H04L 63/1425 726/23 |

* cited by examiner

*Primary Examiner* — Nicholas R Taylor
*Assistant Examiner* — Ho T Shiu
(74) *Attorney, Agent, or Firm* — Klarquist Sparkman, LLP

(57) ABSTRACT

Systems and methods for detecting deviating resources in a virtual environment are disclosed. In one embodiment, a method comprises monitoring tenant usage of a resource of the virtual environment to determine a tenant usage pattern of the resource. The resource is determined to be deviating based on the tenant usage pattern of the resource.

21 Claims, 9 Drawing Sheets

DETECTING DEVIATING RESOURCES IN A VIRTUAL ENVIRONMENT

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or the ability to adapt rapidly to changing computing resource needs.

Managing cloud computing resources, such as those described above, can be complicated. At least part of the complexity can be attributed to the large number of instances of computing resources and the interactions between the computing resources within the cloud computing data center. For example, it can be difficult to design metrics that accurately predict performance degradations of resources in the data center. Poorly performing or unhealthy resources can create a poor customer experience with the cloud computing service provider, causing the customer to seek price discounts for using the resources or causing the customer to change cloud computing service providers.

DETAILED DESCRIPTION

It is possible to draw conclusions about the health of systems of a service provider based on the behavior of users of the systems. For example, customers or users of a cloud computing environment typically have at least some discretion over how they choose to use the available systems within the cloud computing environment. For example, customers can reject resources that do not meet their needs and customers will continue to use resources that are meeting their needs. By monitoring the customer usage of resources of the computing environment, it is possible to draw conclusions about the health of those systems from the behavior of those users. For example, if a particular system (such as a server computer) shows that the average length of a customer's use of the system is significantly lower than other comparable systems then it may indicate that the specific resource in question is not performing correctly. As a more specific example, if a server computer is performing poorly, one or more customers may start instances on the server computer and run them for a shorter period of time on average as compared to run-times on a healthy server computer. Monitoring customer usage to determine the health of distributed computing systems can be applied across many cloud systems, including computing, storage, networking, and other services where customer behavior can indicate whether the customers are impacted by the performance or functionality of a specific resource. In one example, a system which detects customer behavior can perform correlation and statistical analysis to a baseline customer behavior to determine whether a given system resource is unhealthy. If the system determines that a resource is unhealthy, the system can then take an action, such as marking that resource unavailable for further use, or driving an automated remediation workflow.

Figure 1:
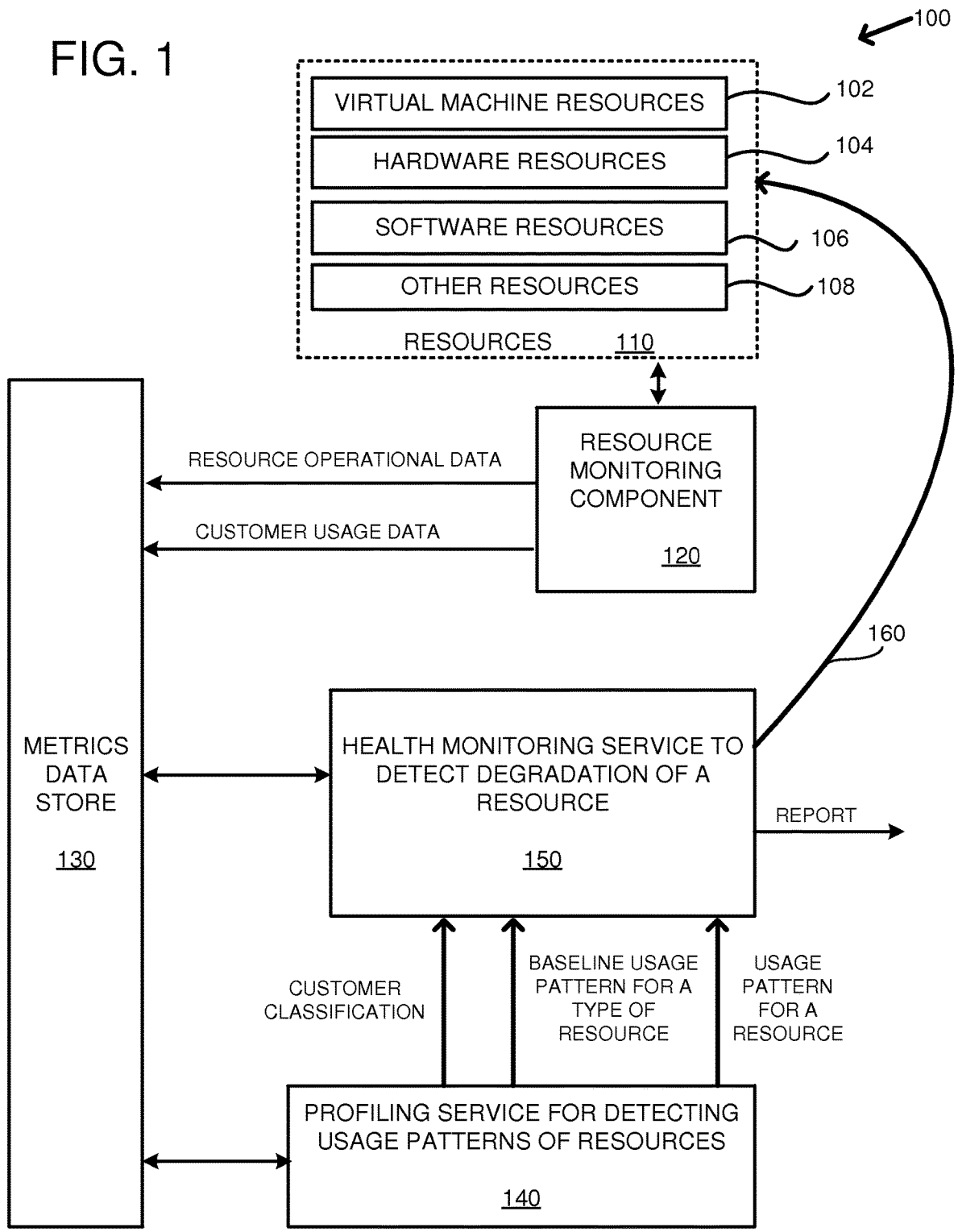
FIG. 1 is a system diagram of an embodiment for detecting a deviating resource of a distributed environment.

FIG. 1 is a system diagram of an embodiment for detecting a deviating resource from resources 110 of a distributed environment 100. A deviating resource can be performing worse than similar resources (e.g., the resource is unhealthy or degraded) or better than similar resources. The resources 110 can include virtual machine resources 102, hardware resources 104, software resources 106, and other resources 108. Hardware resources can include racks of server computers, host server computers, processor configurations, memory configurations, network accessible disk storage, local disk storage, and network devices. Software resources can include operating systems and application programs. A resource can be degraded for a variety of reasons, such as a degradation in performance of processing power, network bandwidth or latency, memory bandwidth or latency, or storage bandwidth or latency, for example.

In one embodiment, the distributed environment 100 is a cloud computing environment that allows customers to purchase and utilize one or more instances of the resources 110, on a permanent or as-needed basis. In one example, a customer can increase its computing capacity by launching or starting multiple instances of resources on distributed environment 100 to perform computing tasks. For example, one or more virtual machine instances can be launched on one or more server computers. Each virtual machine instance can be used to perform a computing task on the server computer. When the computing task is complete, the customer can reduce its computing capacity by tearing down or stopping the resources. Additionally or alternatively, a customer can stop using a resource if the resource is degraded in some way. For example, a customer may execute one or more application checks or benchmarks to test the performance of a server computer when an instance is launched on the server computer. If the benchmarks are met, the customer can continue to execute on the resource until the task is complete but, if the benchmarks are not met, the customer can tear down the resource and re-launch the instance on a different server computer. A customer can also hold onto a resource if the resource is performing at a high level. For example, customer benchmarks may show the resource is performing well, and the customer may continue to execute on the resource without tearing down the resource.

A resource monitoring component 120 executes within the distributed environment 100 and collects resource operational data and customer usage data. Customer usage data includes data associated with customer actions occurring on a resource. For example, the resource monitoring component 120 can collect customer usage data including which virtual machine instances a customer launches on resources 110, which instances a customer terminates or tears down from resources 110, the length of time a customer instance has been operational, the resource utilization of a customer instance, when a customer connects or mounts to a network accessible storage device, and when a customer disconnects or unmounts from a network accessible storage device.

In some implementations, the resource monitoring component 120 can collect resource operational data. Resource operational data includes data associated with the state of the resources 110 that is independent of a particular customer. For example, the resource monitoring component 120 can collect resource operational data including CPU load, memory usage, number of instances running on a host, and a length of time that each of the resources 110 have been operational.

In some embodiments, once the customer usage data and the resource operational data are obtained, the resource monitoring component 120 can store the data in a metrics data store 130. The data store 130 or the resource monitoring component 120 can allow the collected data to be made available for consumption and use by other components. For example, in some embodiments, the resource monitoring component 120 is configured to expose an application programming interface ("API") or another mechanism through which interested parties and other services of the distributed environment 100 can request and receive the data collected for a particular resource 110. It should be appreciated that while the data is discussed herein primarily in the context of data describing the operational state of a resource 110, the metrics stored in the data store 130 can include other information about a resource 110, such as information describing the configuration of the resource and other aspects of a resource, such as its location in the data center, etc. In this way, the resource monitoring component 120 can be utilized to obtain virtually any type of information about a resource 110 in the distributed environment 100.

A profiling service 140 is used to detect usage patterns of the resources and/or customers. Inputs to the profiling service 140 include metrics from the data store 130, such as customer usage data and resource operational data. In an alternative embodiment, the profiling service 140 can receive information directly from the resource monitoring component 120. Using these inputs, the profiling service 140 can determine a usage pattern for a resource, a baseline usage pattern for a type of resource, and a customer classification, for example.

The usage pattern for a resource can include one or more metrics indicating how a customer uses the resource. The usage pattern can be measured for different resources, such as server computers, disk storage, and networking devices by using the data collected from the resource monitoring component 120. Usage patterns can be measured for individual resources or for aggregate resources, such as rooms or clusters or racks of server computers. As described below, one or more usage patterns can be determined for the same type of resource. Detecting a usage pattern can include calculating a measure of repeated customer behavior. Any suitable statistical technique can be used to detect the usage pattern, such as averages, medians, or other statistical measures. The usage pattern can be measured over various time intervals. The usage pattern can be associated with one customer or with multiple customers. Additionally, the usage pattern can be associated with a class of customers.

For example, the resource can be a server computer and the usage pattern can be an average length of time that customer instances have run on the server computer over the last 30 days. As another example, the resource can be a server computer and the usage pattern can be an abandonment rate of instances run on the server computer over the last 10 days. The abandonment rate can be measured by determining a percentage of instances that are run for less than a pre-determined threshold amount of time. The abandonment rate may be indicative of a customer abandoning instances launched on poorly performing resources. Early abandonment can be detected by observing when an instance is launched by a customer and then torn down soon after launching (e.g., if the instance is torn down in less than the pre-determined threshold amount of time). As another example, the resource can be a server computer and the usage pattern can be a turn-over rate of instances run on the server computer over the last 24 hours. The turn-over rate can be measured by determining the number of instances that have been terminated on the server computer over a pre-defined time interval. It will be understood that the time intervals selected are exemplary only; the time intervals can be greater or lesser than the time intervals in these examples.

As another example, the resource can be a storage volume and the usage pattern can be a disconnect or turn-over rate of the storage volume, an average length of time that instances have the storage volume mounted, or the access rate of the storage volume. As another example, the resource can be a network device and the usage pattern can be a disconnect or turn-over rate of the network device or an average length of time that instances use the network device. As yet another example, the resource can be a rack of servers and the usage pattern can be a turn-over rate of instances executing on the rack of servers.

The profiling service 140 can calculate the baseline usage pattern for a type of resource by combining usage patterns from multiple resources of the same type. The baseline usage pattern can be calculated using aggregated data of a large number of customers, whereas customer usage data is typically computed on a per customer basis. Additionally, the baseline usage pattern for a type of resource can be an average of usage patterns from multiple resources of the same type, whereas the customer usage data is typically based on a single resource being analyzed. In one embodiment, resources of the same type can include resources at the same point in their operational or life cycle. It may be desirable to classify resources at different points in their lifecycles because customer usage patterns may differ based on the point in the resource's lifecycle. For example, server computers that have been operational for less than a week can be classified as one type of resource and server computers that have been operational for more than a week can be classified as a different type of resource. A server computer that has been operational for a year may include many long-running customer instances that weight an average run-time of instances on the resource toward a longer period. On the other hand, a server computer that has been operational for a week could not have any customer instances that have run for more than a week. Thus, baseline usage patterns may be more meaningful when measured for resources at a similar points in their lifecycles.

The profiling service 140 can classify customers to generate a customer classification. For example, each customer may use the resource in widely varying ways. Some customers may be "spiky" or bursty, meaning that these customers tend to launch and tear down instances at a higher rate as compared to other customers. Other customers may be "stable," meaning that these customers tend to add or reduce capacity at a slower rate as compared to other customers. Classifying customers can include giving a customer a score based on how spiky or stable the customer is.

Customers can also be classified based on typical workload profiles of the customers. For example, some customers may launch instances that have high processor utilization, large memory footprints, high network bandwidth, and/or a high rate of storage accesses. In other words, some customers may launch instances that are compute-intensive, memory-intensive, network-intensive, and/or storage-intensive. Classifying customers can include determining different scores for respective customers based on the respective customer's average use of compute, memory, network, and storage resources. Classifications can be associated with a customer or with a given type of instance launched by the customer. For example, some customers may launch instances with different workload profiles, e.g., a customer may launch both a CPU-intensive instance and a network-intensive instance. Each instance launched by a customer can be identified with an identifier associated with the instance or by observing the instance's use of certain APIs. Thus, some instances launched by a customer can be given one classification and other instances launched by the customer can be given a different classification based on the workload profile of each instance.

The profiling service 140 can calculate the baseline usage pattern for a type of resource based on one customer or multiple customers. For example, by basing a baseline usage pattern for a type of resource on one customer, it may be possible to see if that customer's behavior changes when using a specific resource. Similarly, the profiling service 140 can calculate different baseline usage patterns for a type of resource based on the customer classification. In this manner, it may be possible to see if a class of customer's behavior changes when using a specific resource. As one example, baseline usage patterns may be more meaningful by having a first baseline usage pattern for spiky customers and a second baseline usage pattern for stable customers. In this manner, spiky customer behavior may not pollute stable customer baselines and vice versa. As another example, a first baseline usage pattern can be calculated for customers running CPU-intensive instances and a second baseline usage pattern can be calculated for customers running memory-intensive instances.

In an alternate embodiment, the profiling service 140 can use pre-determined baseline usage patterns for a type of resource. For example, the baseline usage pattern for a type of resource can be supplied through a database having fields populated by an administrator of the distributed environment 100. The pre-determined baseline usage patterns for a type of resource can be based on historical usage patterns or desired usage patterns. Using pre-determined baseline usage patterns for a type of resource may reduce the computing overhead associated with frequently calculating running baseline usage patterns for a type of resource. On the other hand, pre-determined baseline usage patterns for a type of resource may generate false-positives of deviating resources if the customer usage of the distributed environment 100 changes from when the pre-determined baseline usage patterns for a type of resource were calculated.

In one embodiment, the data store 130 can be used to communicate output data from the profiling service 140 to a health monitoring service 150. In other words, the output from the profiling service 140 (e.g., the usage pattern for each resource, the baseline usage patterns for each type of resource, and customer classification data) can be written to the data store 130, where it can be read by the health monitoring service 150. In an alternate embodiment, the health monitoring service 150 can receive the usage pattern for each resource, the baseline usage patterns for each type of resource, and customer classification data from the profiling service 140.

The health monitoring service 150 is used to detect a deviating resource based on, at least, customer usage data of the resource. Generally, the health monitoring service 150 monitors the customer usage of the resources and analyzes the customer usage data to find outlier conditions. If outlier conditions are found for a resource, then the resource may be degraded. For example, a server may be degraded if customers continually abandon instances that are launched on the server. A server may be performing better than expected if customers run instances on the server longer than comparable customers. A storage volume may be degraded if customers rehome their data onto different volumes, if the customers rarely access the data stored on the storage volume, or if customers continually disconnect and reconnect to the same volume.

In one embodiment, the health monitoring service 150 compares the usage pattern for a resource to a baseline usage pattern for a similar type of resource. As an example, if the usage pattern for the resource differs by more than a pre-determined threshold compared to the baseline usage pattern for the type of resource then the resource may be a deviating resource. In other words, a deviating resource can be detected if the usage pattern for the resource deviates from or is an outlier compared to the baseline usage pattern for the type of resource. For example, if a given resource has a turn-over rate of 50 instances per day, but the baseline turn-over rate is 5 instances per day, then the resource may be degraded (e.g., deviating) since customers appear to be rejecting the resource at a significantly higher rate than the baseline. As another example, if an average run-time for instances on a resource is only 1.5 days, but the baseline average run-time for instances on similar resources is 30 days, then the resource may be degraded (e.g., deviating). As yet another example, if an average run-time for instances on a resource is over 100 days, but the baseline average run-time for instances on similar resources is 30 days, then the resource may be performing better than expected (e.g., deviating).

The usage pattern for a resource and the baseline usage pattern can be measured over the same time interval or over different time intervals. For example, the baseline usage pattern may be based on a rolling average over 60 days and the usage pattern for a resource may be based on a rolling average over 7 days. A longer time interval may filter out short term fluctuations and so a longer time interval may be desirable for the baseline usage pattern. However, the longer time interval may delay the identification of new trends, so a shorter time interval may be desirable for the usage pattern for a given resource. In other words, using a shorter time interval for the usage pattern for a given resource may allow a deviating resource to be detected sooner than if a longer time interval is used.

The health monitoring service 150 can generate a report on the health of the resources 110 in the distributed environment 100. For example, the health monitoring service 150 can generate an indication that a resource is deviating if the customer usage pattern of the resource deviates from the baseline usage pattern for similar resources. The deviation can be measured by a score or by one or more thresholds. As another example, the health monitoring service 150 can generate a report that a resource is healthy if the customer usage pattern of the resource is within a pre-determined range of the baseline usage pattern for similar resources. Reports can be written to a database for later retrieval by a system administrator, emailed to a system administrator, or provided to a user interface, for example.

The health monitoring service 150 can provide feedback as indicated by arrow 160 to control future use of a resource. For example, the health monitoring service 150 can be used to mark a resource as disfavored for launching new services if the resource is degraded. Alternatively, a degraded resource can be added to a disfavored pool of resources that are only used if a favored pool of resources are all unavailable. The health monitoring service 150 can be used to make a resource unavailable for launching new services if the resource is degraded. In this manner, new customer instances can be launched on healthy resources and the degraded resource can be further diagnosed or removed from service.

In one embodiment, the health monitoring service 150 can mark a strongly performing resource as favored for launching new services. Alternatively, a strongly performing resource can be added to a favored pool of resources that cost more to launch than the resources that perform closer to baseline. Generalizing, the health monitoring service 150 can categorize or "bin" the resources into different performance classes based on the usage patterns of the resource. In one example, classification into different performance classes can be determined by comparing a customer usage pattern to different baseline usage patterns, where each baseline usage pattern corresponds to a resource performing at a different respective performance level. In another example, classification into different performance classes can be determined by comparing a customer usage pattern to one baseline usage pattern, and the classification is based on an amount of deviation from the baseline usage pattern. As a specific example, a server computer can be classified as a normal resource if the average run-time for instances on the server computer is within 30% of the average run-time for instances on similar server computers; the server computer can be classified as a strongly performing resource if the average run-time for instances on the server computer is greater than 30% of the average run-time for instances on similar server computers; and the server computer can be classified as a poorly performing resource if the average run-time for instances on the server computer is less than 30% of the average run-time for instances on similar server computers.

In one embodiment, the health monitoring service 150 can diagnose the deviating resource based on a customer classification associated with the usage data. For example, if customers with CPU-intensive instances consistently reject the resource, but customers with less CPU-intensive instances continue to use the resource, then it is possible that the CPU of the resource is degraded. Similarly, if customers with network-intensive instances consistently reject the resource, but customers with less network-intensive instances continue to use the resource, then it is possible that networking hardware of the resource is degraded. As a specific example, if the typical customer usage of the distributed environment uses 0.2 Gbit/sec of network bandwidth, but one class of customers (network-intensive customers) use an average of 1 Gbit/sec, then determining that only the network-intensive customers reject the resource can show that the resource may have degraded network performance.

The health monitoring service 150 can determine a confidence level in the diagnosis of the deviating resource, and different actions may be performed based on the confidence level in the diagnosis of the deviating resource. For example, a high-confidence threshold and a low-confidence threshold can be set. If the usage pattern for the resource differs by more than the low threshold but less than the high threshold compared to the baseline usage pattern for the type of resource then the resource may be deviating and the confidence in the diagnosis may be low. Alternatively, if the usage pattern for the resource differs by more than the high threshold compared to the baseline usage pattern for the type of resource then the resource may be deviating and the confidence in the diagnosis may be high. For example, if a given resource has a baseline turn-over rate of 10 instances per day, a low threshold is set at 100% of the baseline turn-over rate, and a high threshold is set at 500% of the baseline turn-over rate, then the resource is diagnosed as healthy if the turn-over rate is less than or equal to 20 instances per day, the resource is diagnosed as degraded with a low confidence level if the turn-over rate is between 21 and 60 instances per day, and the resource is diagnosed as degraded with a high confidence level if the turn-over rate is greater than 60 instances per day.

Alternatively, the confidence level can be measured by a score that is based on how much the usage pattern for the resource varies from the baseline usage pattern for the type of resource, where larger variances receive larger confidence scores. As another alternative, the confidence level can be based on a customer classification. For example, some customers may be more sensitive to or more accurate at predicting deviating resources. The behavior of the sensitive customers may be given more weight than the behavior of the less sensitive customers. Thus, the confidence level may be higher when the sensitive customer behavior differs from the baseline as compared to when a non-sensitive customer behavior differs from the baseline by a similar amount.

When confidence in the diagnosis is high, then health monitoring service 150 may perform stronger actions, such as making a degraded resource unavailable to customers or sending an alert to a system administrator, for example. When confidence in the diagnosis is low, then health monitoring service 150 may perform weaker actions, such as only generating a report or marking a degraded resource as disfavored, for example.

Although not shown, other parameters can be used in both the health monitoring service 150 and the profiling service 140. Additionally, some of the parameters illustrated can be ignored or eliminated.

Figure 2:
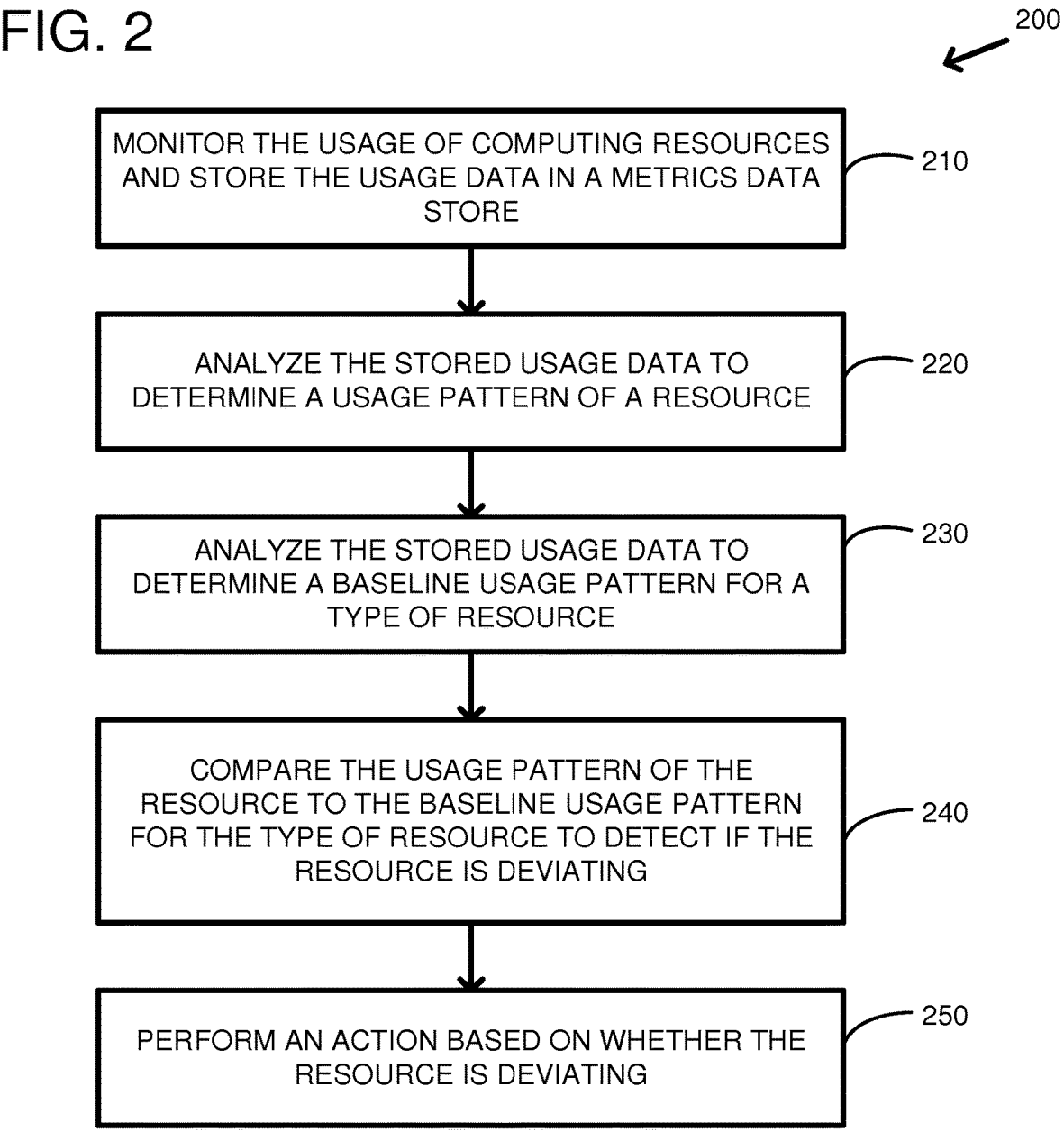
FIG. 2 is a flowchart of a method for detecting a deviating resource of a distributed environment, according to one embodiment.

FIG. 2 is a flowchart of a method 200 for detecting a deviating resource of a distributed environment, such as the distributed environment 100 of FIG. 1. At 210, the usage of computing resources are monitored and the usage data is stored in a metrics data store. Monitoring usage of the computing resources includes monitoring at least two types of data: resource usage or operational data that is independent of any particular customer and customer usage data that is associated with a resource. The resource operational data can be used for distinguishing between and classifying resources of the same type. For example, the resource operational data can include the length of time that a particular resource has been operational. The resource operational data can include configuration information, such as the hardware and software installed for each resource, any patches or updates applied to the software, and maintenance records for the resource, for example. Monitoring customer usage of the resource includes monitoring customer actions associated with the resource. The customer usage data may be indicative of customer behavior and can be aggregated and analyzed (such as at 220, 230, 240, 250) to detect a deviating resource of the distributed environment. The customer usage data can also be used to classify customers based on the rate at which they start and terminate resources (e.g., spiky or stable) or based on the way they utilize the resources (e.g., memory-intensive, processor-intensive, storage-intensive, or network-intensive). In one embodiment, the resource monitoring component 120 can monitor the usage of resources 100. The resource monitoring component 120 can store resource operational data, e.g., data that is independent of any particular customer, and customer usage data in metrics data store 130.

At 220, the stored usage data can be analyzed to determine a usage pattern of a resource. Generally, the usage pattern can measure a usage parameter over a predetermined period of time. In other words, analyzing the stored usage data to determine a usage pattern of a resource can include calculating a usage parameter over a predetermined period of time. For example, the usage parameter can be an abandonment rate, a turn-over rate, an average run-time for an instance, or any measure suitable for indicating a history of repeated customer behavior. As described above, a short history may be desirable for promptly detecting new trends. The usage pattern of the resource can be based on a single customer, all customers, or a particular class of customers that use the resource. In one embodiment, the profiling service 140 can read the stored usage data (e.g., the resource operational data and the customer usage data) from metrics data store 130. The profiling service 140 can analyze the stored usage data to generate the usage pattern of a resource. For example, profiling service 140 can calculate a turn-over rate of instances over the last 10 days for a given server computer.

At 230, the stored usage data can be analyzed to determine a baseline usage pattern for a type of resource. Analyzing the stored usage data to determine a baseline usage pattern for a type of resource can include calculating a usage parameter for a type of resource over a predetermined period of time. The usage parameter can be an abandonment rate, a turn-over rate, an average run-time for an instance, or any measure suitable for indicating a history of repeated customer behavior. In other words, the baseline usage pattern for a type of resource can include a measure of repeated customer behavior for a type of resource over a predetermined period of time. The baseline usage pattern for a type of resource is typically based on multiple customers. However, the baseline usage pattern for a type of resource can be based on a single customer, all customers, or a particular class of customers that use the resource. As one example, the baseline usage pattern can be calculated by adding a usage pattern parameter for multiple similar resources over a predetermined period of time, and dividing the sum by the number of similar resources. As described above, a longer history may be desirable for filtering out short-term fluctuations in the baseline. As another example, usage patterns of similar respective resources calculated at 220 can be averaged to generate the baseline usage pattern for a type of resource. In one embodiment, the profiling service 140 can read the stored usage data (e.g., the resource operational data and the customer usage data) from metrics data store 130. The profiling service 140 can analyze the stored usage data to generate the baseline usage pattern for a type of resource. For example, the profiling service can calculate a baseline turn-over rate of instances over the last 60 days for similar server computers. If there are 10 similar server computers, then the turn-over rate over the last 60 days for each server computer can be calculated, the turn-over rates can be added, and the sum can be divided by 10 to generate the baseline turn-over rate of instances for the similar server computers.

At 240, the usage pattern of the resource can be compared to the baseline usage pattern for the type of resource to detect if the resource is deviating from, or not in alignment with the baseline usage pattern. Comparing the usage pattern of the resource to the baseline usage pattern for the type of resource can include calculating a difference between the usage pattern of the resource and the baseline usage pattern for the type of resource, and comparing the difference to one or more predetermined thresholds, such as a high-confidence and a low-confidence threshold. Comparing the usage pattern of the resource to the baseline usage pattern for the type of resource can include determining a confidence level in the diagnosis of the health of the resource. Comparing the usage pattern of the resource to the baseline usage pattern for the type of resource can include weighting a customer or a class of customers more heavily than other customers. For example, the comparison can include multiplying a usage pattern of the resource by a customer classification weighting parameter to get a usage score, and determining if the usage score is less than the baseline usage pattern for the type of resource. In one embodiment, the health monitoring service 150 can compare the usage pattern of the resource to the baseline usage pattern for the type of resource to detect if the resource is deviating. For example, the health monitoring service 150 can calculate a difference between the turn-over rate of instances for a server computer and the baseline turn-over rate of instances for similar server computers, and the difference can be compared to a pre-determined threshold. If the difference is less than the threshold, the server may be healthy, but if the difference is more than the threshold, the server may be deviating.

At 250, an action can be performed based on whether the resource is deviating. For example, the health monitoring service 150 can perform an action based on whether the resource is deviating. If the resource is not deviating, a report can be generated indicating that the resource is performing within an acceptable range of the baseline. If the resource is deviating, a report can be generated indicating that the resource is deviating. A resource can be classified or "binned" based on how much the usage pattern of the resource deviates from the baseline usage pattern of similar resources. A strongly performing resource can be placed in a favored pool. A degraded resource can be placed in a disfavored pool of resources or the resource can be made unavailable for launching new services. An unhealthy resource can be diagnosed to determine a source of the degradation. For example, a suite of diagnostic tools can be used to diagnose the source of the degradation. As another example, customer classifications or profiles associated with the usage data of the resource tools can be used to diagnose the source of the degradation.

Figure 3:
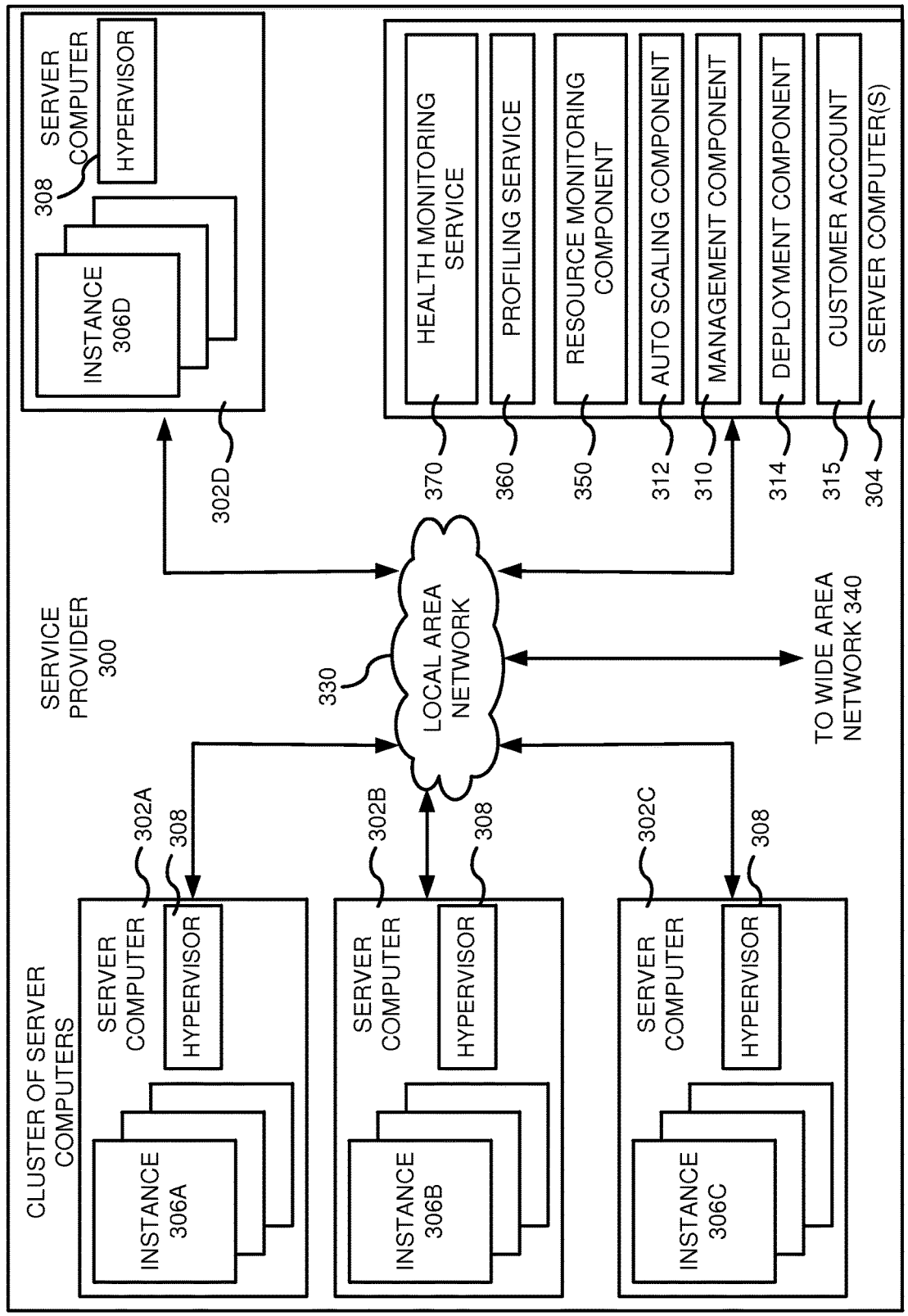
FIG. 3 is an example system diagram showing a plurality of virtual machine instances running in a multi-tenant environment.

FIG. 3 is a computing system diagram of a network-based service provider 300 that illustrates one environment in which embodiments described herein can be used. By way of background, the service provider 300 (i.e., the cloud provider) is capable of delivery of computing and storage capacity as a service to a community of end recipients or tenants. In an example embodiment, the compute service provider can be established for an organization by or on behalf of the organization. That is, the service provider 300 may offer a "private cloud environment" where each of the tenants are internal customers. Internal customers come from within the organization, but may be distinguished by project, cost-center, division, affiliate, or subsidiary, for example. In another embodiment, the service provider 300 supports a multi-tenant environment, wherein one or more of the tenants are external customers and the tenants operate independently (i.e., a public cloud environment). Generally speaking, the service provider 300 can provide the following models: Infrastructure as a Service ("IaaS"), Platform as a Service ("PaaS"), and/or Software as a Service ("SaaS"). Other models can be provided. For the IaaS model, the service provider 300 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the service provider 300 using networked client devices, such as desktop computers, laptops, tablets, smartphones, etc. running web browsers or other lightweight client applications. Those skilled in the art will recognize that the service provider 300 can be described as a "cloud" environment.

The particular illustrated service provider 300 includes a plurality of server computers 302A-302D. While only four server computers are shown, any number can be used, and large centers can include thousands of server computers. The server computers 302A-302D can provide computing resources for executing software instances 306A-306D. In one embodiment, the instances 306A-306D are virtual machines. As known in the art, a virtual machine is an instance of a software implementation of a machine (i.e. a computer) that executes applications like a physical machine. In the example of virtual machine, each of the server computers 302A-302D can be configured to execute a hypervisor 308 or another type of program configured to enable the execution of multiple instances 306 on a single server. Additionally, each of the instances 306 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 304 can be reserved for executing software components for managing the operation of the server computers 302 and the instances 306. For example, the server computer(s) 304 can execute a management component 310. A customer can access the management component 310 to configure various aspects of the operation of the instances 306 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 312 can scale the instances 306 based upon rules defined by the customer. In one embodiment, the auto scaling component 312 allows a customer to specify scale-up rules for use in determining when new instances should be instantiated and scale-down rules for use in determining when existing instances should be terminated. The auto scaling component 312 can consist of a number of subcomponents executing on different server computers 302 or other computing devices. The auto scaling component 312 can monitor available computing resources over an internal management network and modify resources available based on need.

A deployment component 314 can be used to assist customers in the deployment of new instances 306 of computing resources. The deployment component can have access to account information associated with the instances, such as who is the owner of the account, credit card information, country of the owner, etc. The deployment component 314 can receive a configuration from a customer that includes data describing how new instances 306 should be configured. For example, the configuration can specify one or more applications to be installed in new instances 306, provide scripts and/or other types of code to be executed for configuring new instances 306, provide cache logic specifying how an application cache should be prepared, and other types of information. The deployment component 314 can utilize the customer-provided configuration and cache logic to configure, prime, and launch new instances 306. The configuration, cache logic, and other information may be specified by a customer using the management component 310 or by providing this information directly to the deployment component 314. The instance manager can be considered part of the deployment component.

Customer account information 315 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 330 can be utilized to interconnect the server computers 302A-302D and the server computer(s) 304. The network 330 can be a local area network (LAN) and can be connected to a Wide Area Network (WAN) 340 so that end users can access the service provider 300. It should be appreciated that the network topology illustrated in FIG. 3 has been simplified and that many more networks and networking devices can be utilized to interconnect the various computing systems disclosed herein.

A resource monitoring component 350 can be used to monitor the usage of resources of server computers 302 and to store data associated with the usage of the resources. The resource monitoring component 350 can gather metrics from any of the available server computers, such as resource operational data and customer usage data. The resource monitoring service 350 can also use any available services offered by the compute service. As described above, profiling service 360 can communicate with the resource monitoring component 350 (or an associated database) to acquire the metrics to detect usage patterns of the resources of server computers 302. For example, the profiling service 360 can generate a usage pattern for each resource, a baseline usage pattern for each type of resource, and customer classifications. The generated data can be communicated from the profiling service 360 to a health monitoring service 370. As described above, the health monitoring service 370 can use the generated data to detect deviating resources. When a deviating resource is detected, health monitoring service 370 can generate a report, diagnose the resource, or make the resource unavailable for launching new services, for example.

Figure 4:
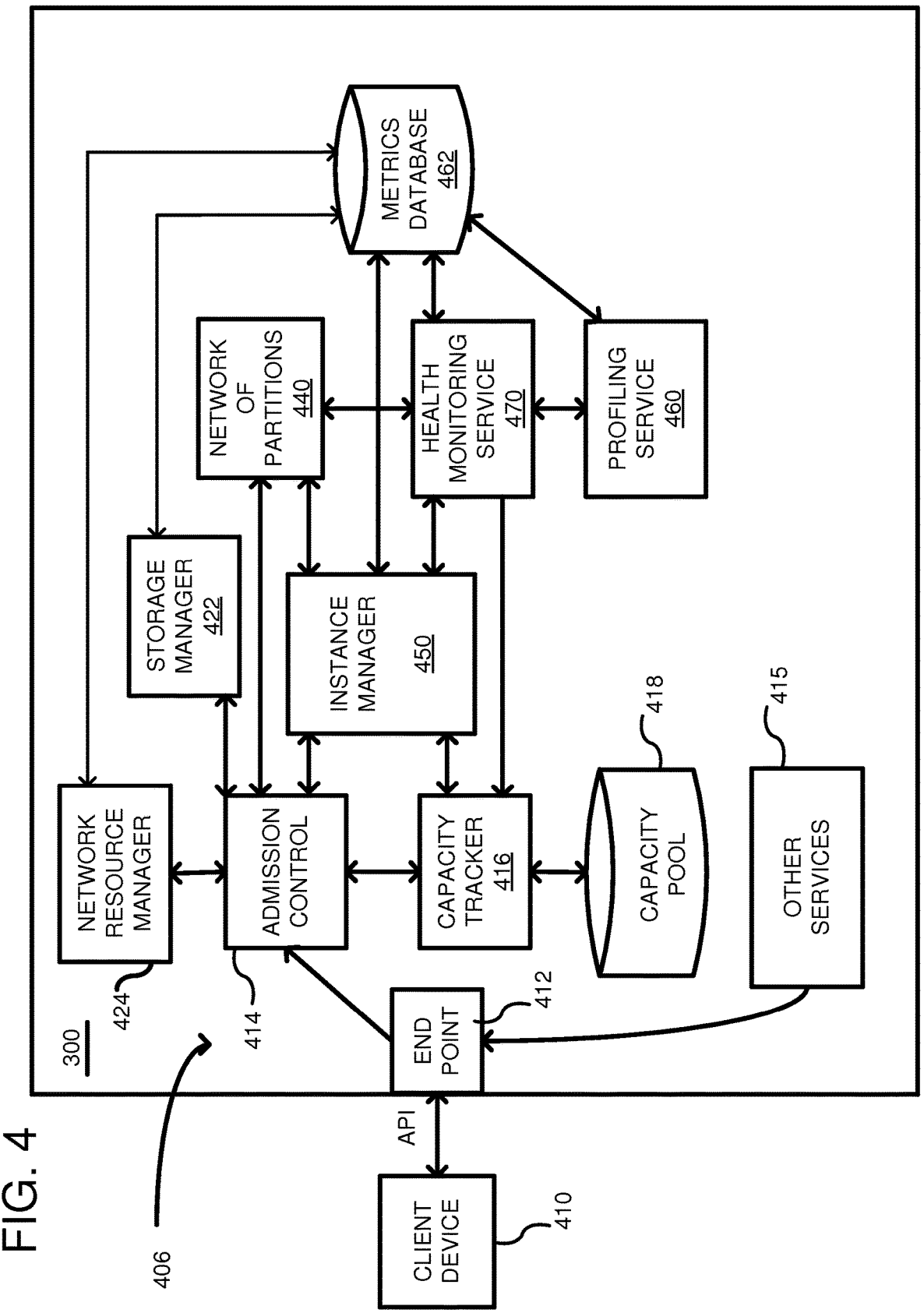
FIG. 4 shows further details of an example system including a plurality of management components associated with a control plane.

FIG. 4 illustrates in further detail management components 406 that can be used in the multi-tenant environment of the service provider 300. In order to access and utilize instances (such as instances 306 of FIG. 3), a client device can be used. The client device 410 can be any of a variety of computing devices, mobile or otherwise including a cell phone, smartphone, handheld computer, Personal Digital Assistant (PDA), desktop computer, etc. The client device 410 can communicate with the service provider 300 through an end point 412, which can be a DNS address designed to receive and process API requests. In particular, the end point 412 can be a web server configured to expose an API. Using the API requests, a client 410 can make requests to implement any of the functionality described herein. Other services 415, which can be internal to the service provider 300, can likewise make API requests to the end point 412.

Other general management services that may or may not be included in the service provider 300 include an admission control 414, e.g., one or more computers operating together as an admission control web service. The admission control 414 can authenticate, validate and unpack the API requests for service or storage of data within the service provider 300. The capacity tracker 416 is responsible for determining how the servers need to be configured in order to meet the need for the different instance types by managing and configuring physical inventory in terms of forecasting, provisioning and real-time configuration and allocation of capacity. The capacity tracker 416 maintains a pool of available healthy inventory in a capacity pool database 418. The capacity tracker 416 can also maintain a pool of disfavored inventory in the capacity pool database 418. The capacity tracker 416 can also monitor capacity levels so as to know whether resources are readily available or limited. An instance manager 450 controls launching and termination of instances in the network. When an instruction is received (such as through an API request) to launch an instance, the instance manager pulls resources first from the available healthy inventory stored in the capacity pool 418 and launches the instance on a decided upon host server computer. When the healthy inventory is exhausted, the instance manager can pull resources first from the disfavored inventory stored in the capacity pool 418 and launches the instance on a decided upon host server computer. A network of partitions 440 is described further in relation to FIG. 5 and includes a physical layer upon which the instances are launched.

Similar to the instance manager are the storage manager 422 and the network resource manager 424. The storage manager 422 relates to initiation and termination of storage volumes, while the network resource manager 424 relates to initiation and termination of network devices such as routers, switches, and subnets. The instance manager 450, network resource manager 424, and storage manager 422 monitor the usage of respective resources and store respective usage data in a metrics database 462.

A profiling service 460 was described above in relation to FIGS. 1 and 2. The profiling service 460 analyzes the usage data stored in the metrics database 462 to determine usage patterns for each resource. The profiling service 460 can also analyze the usage data stored in the metrics database 462 to determine baseline usage patterns for each type of resource and to classify customers. The usage patterns for the resources, the baseline usage patterns for each type of resource, and the customer classifications are communicated to a health monitoring service 470.

The health monitoring service 470 was described above in relation to FIGS. 1 and 2. In addition to what was already described, the health monitoring service 470 can also provide monitoring for resources and the applications customers run on the service provider 300. As described above, the health monitoring service 470 can detect if resources are deviating based on usage patterns of the resource. For example, the usage pattern of a resource can be compared to a baseline usage pattern for similar resources to detect if the resource is deviating. The health monitoring service 470 can perform actions based on the health of the resource. For example, the health monitoring service 470 can communicate unhealthy resources to the capacity tracker 416 so that instances are not launched from the unhealthy resources. The health monitoring service 470 can communicate disfavored resources to the capacity tracker 416 so that instances are not launched from the disfavored resources until the favored resources are exhausted. Communication between the health monitoring service 470 and the capacity tracker 416 can occur directly, through the instance manager, or through the metrics database 462.

In one embodiment, the health monitoring service 470 can diagnose systematic problems of the multi-tenant environment based on the unhealthy resources that were detected by analyzing customer usage data. For example, if a number of degraded resources are associated with one or more common components of the multi-tenant environment, then one or more of the common components may be degraded. In other words, degraded components not directly accessible by the customer, may be diagnosed based on triangulating the components that are common to the degraded resources. For example, if the degraded resources are all connected by a common switching device, then the common switching device may be degraded.

System administrators can use the health monitoring service 470 to collect and track metrics, and gain insight to how applications are running. For example, the health monitoring service 470 can allow system-wide visibility into application performance and operational health. Metrics and reports generated by the health monitoring service 470 can be stored in the metrics database 462.

Figure 5:
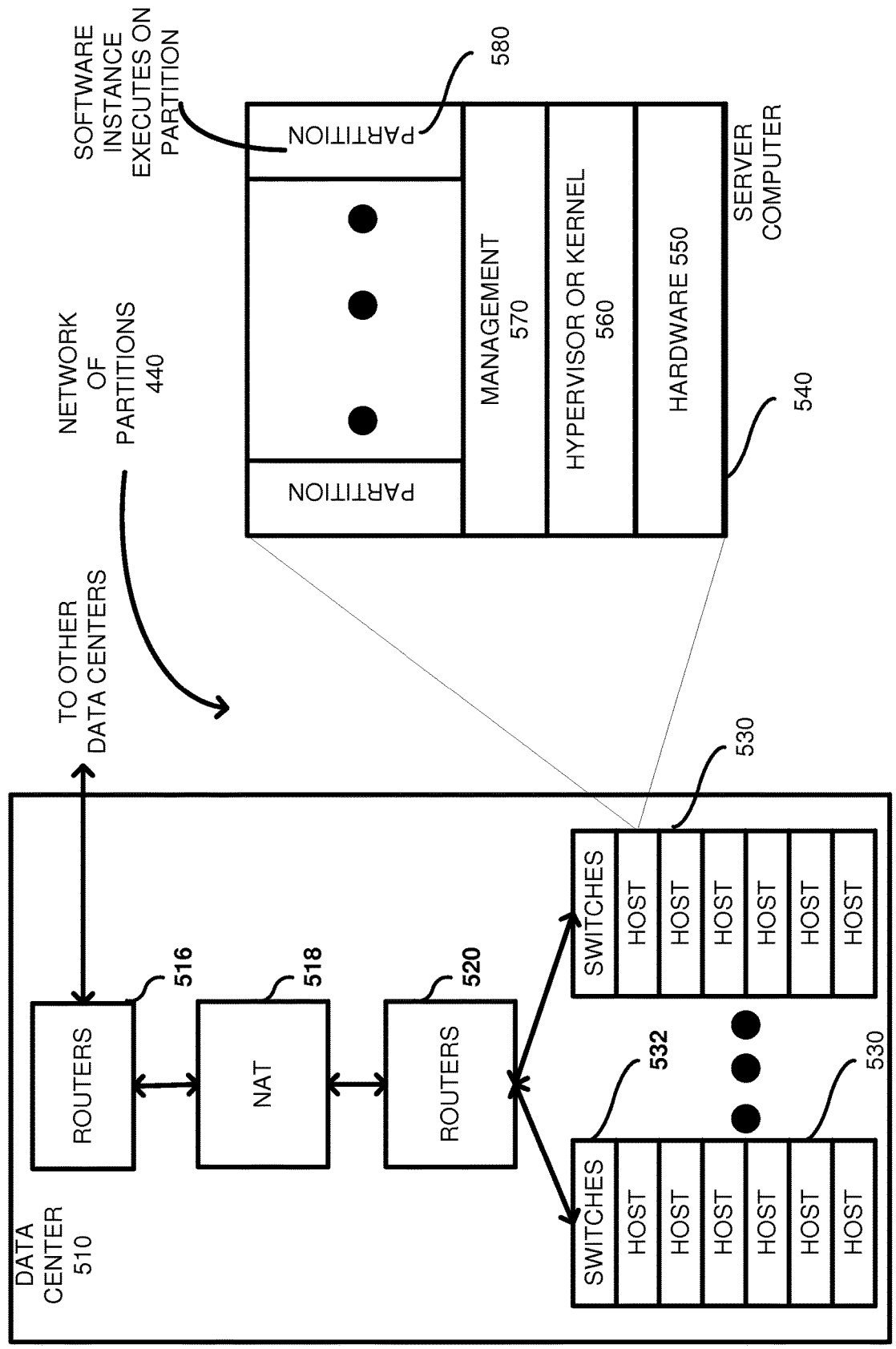
FIG. 5 shows an example of a plurality of host computers, routers and switches, which are hardware assets used for running virtual machine instances.

FIG. 5 illustrates the network of partitions 440 and the physical hardware associated therewith. The network of partitions 440 can include a plurality of data centers, such as data center 510, coupled together by routers 516. The routers 516 read address information in a received packet and determine the packet's destination. If the router decides that a different data center contains a host server computer, then the packet is forwarded to that data center. If the packet is addressed to a host in the data center 510, then it is passed to a network address translator (NAT) 518 that converts the packet's public IP address to a private IP address. The NAT also translates private addresses to public addresses that are bound outside of the datacenter 510. Additional routers 520 can be coupled to the NAT to route packets to one or more racks of host server computers 530. Each rack 530 can include a switch 532 coupled to multiple host server computers. A particular host server computer is shown in an expanded view at 540.

Each host 540 has underlying hardware 550 including one or more CPUs, memory, storage devices, etc. Running a layer above the hardware 550 is a hypervisor or kernel layer

560. The hypervisor or kernel layer can be classified as a type 1 or type 2 hypervisor. A type 1 hypervisor runs directly on the host hardware 550 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 570 can be part of the hypervisor or separated therefrom and generally includes device drivers needed for accessing the hardware 550. The partitions 580 are logical units of isolation by the hypervisor. Each partition 580 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 570, which can then pass the metrics to the profiling service 460 and/or the health monitoring service 470 for storage in the metrics database 462. Additionally, the management layer 570 can pass to the profiling service 460 and/or the health monitoring service 470 the number of instances that are running, when they were launched, the operating system being used, the applications being run, etc. All such metrics can be used for consumption by the profiling service 460 and the health monitoring service 470 and stored in database 462.

Figure 6:
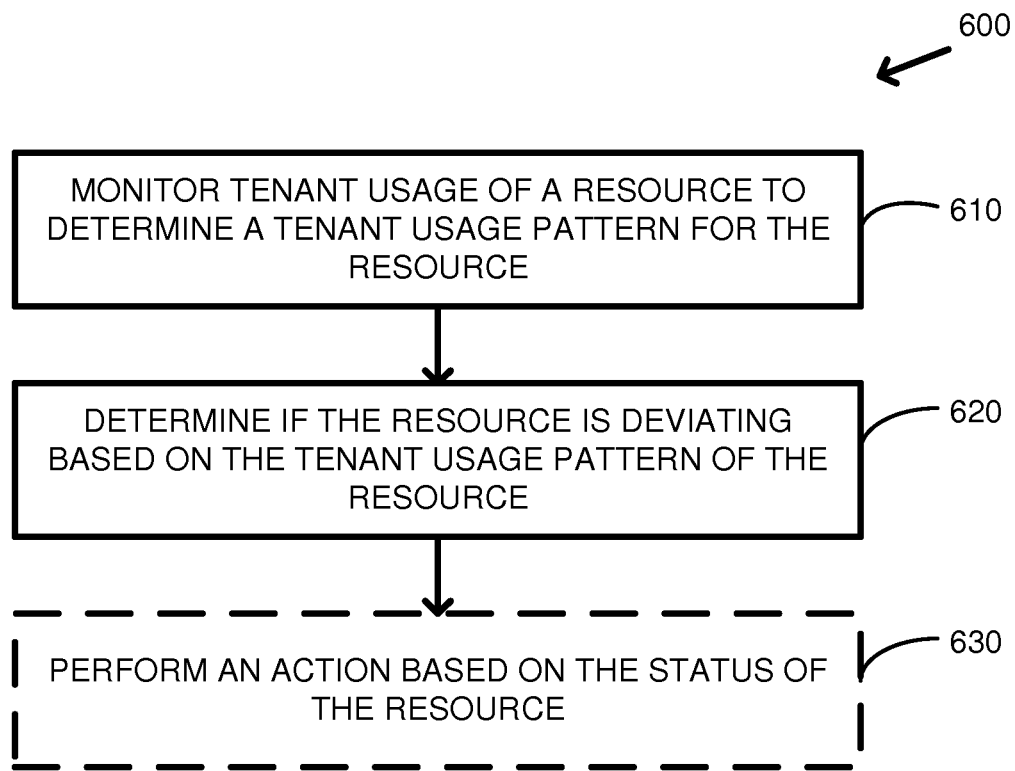
FIG. 6 is a flowchart of a method for detecting a deviating resource of a service provider, according to one embodiment.

FIG. 6 is a flowchart of an embodiment of a method 600 for detecting a deviating resource of a multi-tenant environment. At 610, tenant usage of a resource is monitored to determine a tenant usage pattern of the resource. Tenant usage patterns can include an abandonment rate of virtual machine instances launched on a server computer, a turnover rate of virtual machine instances launched on a server computer, a disconnect rate of a network accessible storage device, a disconnect rate of a network device, or other suitable patterns. Tenant usage patterns of each resource can be averaged to generate a baseline tenant usage pattern of similar resources. Similar resources can include all resources of a similar type, e.g., all server computers, all storage volumes, or all network devices, for example. Similar resources can include resources with similar operational characteristics, e.g., server computers that have been operational for more than one month, for example. Tenants can be classified based on the tenant usage patterns of the resources. For example, tenants can be classified based on whether their usage of the resources is spiky or stable. Tenants can be classified based on whether the instances they run are compute intensive, memory intensive, network intensive, and/or storage intensive. All instances run by the tenant can have the same classification or each type of instance run by the tenant can have its own classification. Different baseline tenant usage patterns can be calculated based on the tenant classifications. For example, a first baseline tenant usage pattern can be calculated for spiky tenants and a second baseline tenant usage pattern can be calculated for stable tenants.

At 620, it is determined if the resource is deviating based on the tenant usage pattern of the resource. For example, the tenant usage pattern of the resource can be compared to a baseline usage pattern for similar resources. If the tenant usage pattern of the resource differs from the baseline usage pattern for similar resources by more than a threshold then the resource may be deviating. Multiple thresholds can be selected. For example, a low threshold and a high threshold can be selected, where the low threshold is associated with a low confidence that the resource is deviating and the high threshold is associated with a higher confidence that the resource is deviating.

At 630, an action can be optionally performed based on the status of the resource. For example, the status of the resource can be healthy (e.g., operating near the baseline level), possibly deviating (e.g., the confidence level is low that the resource is either strongly performing or degraded), and probably deviating (e.g., the confidence level is high that the resource is either strongly performing or degraded), and it may be desirable to perform different actions based on the status of the resource.

Figure 7:
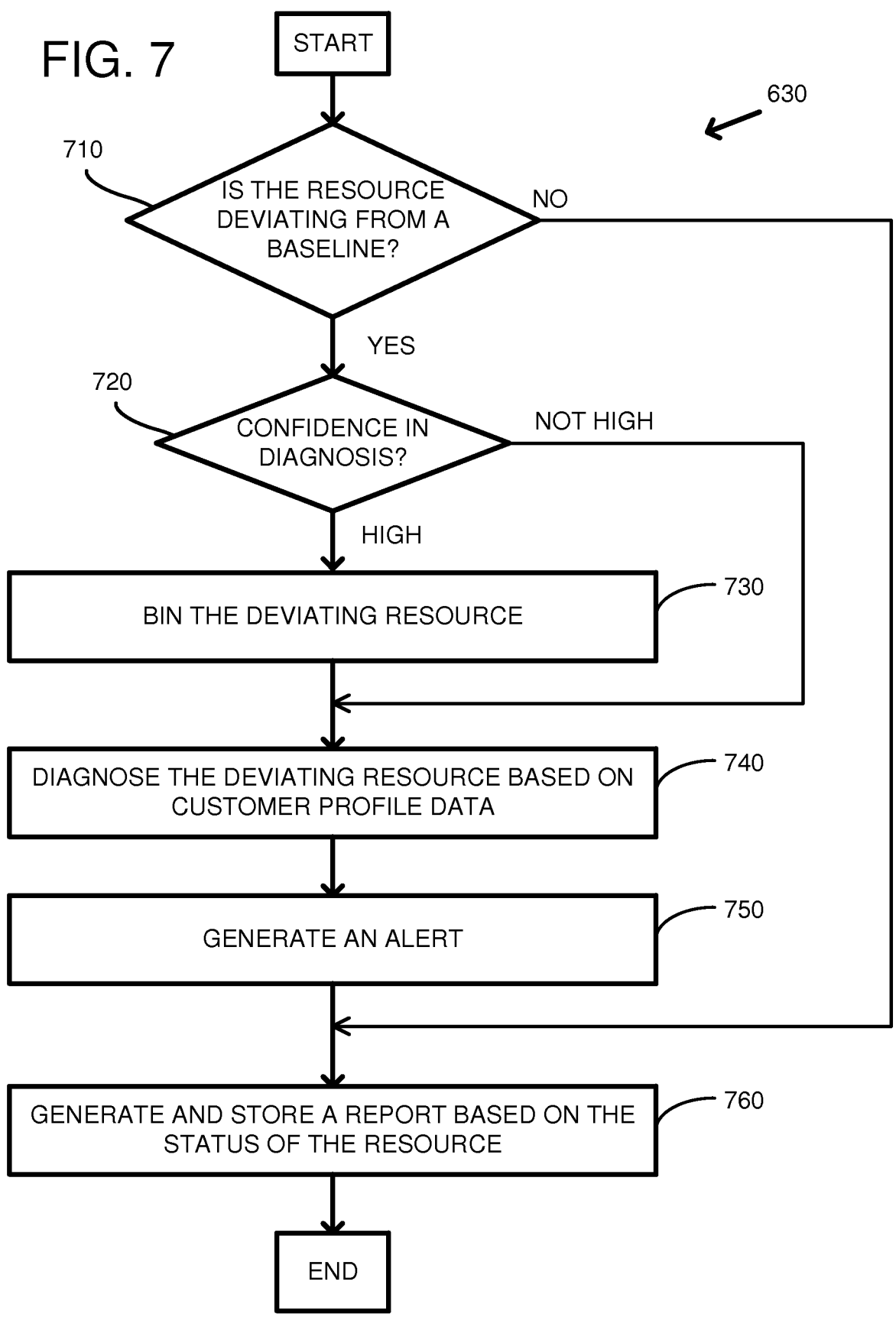
FIG. 7 is a flowchart of a method for responding to the status of a resource.

FIG. 7 is a flowchart of an embodiment of a method for responding to the status of a resource. At 710 and 720, the status of the resource is determined. If the resource is not deviating, e.g., the resource is operating near the baseline level, the method continues at 760. If the resource is possibly deviating, e.g., the confidence in the diagnosis is low, the method continues at 740. If the resource is probably deviating, e.g., the confidence in the diagnosis is high, the method continues at 730.

At 730, the deviating resource can be binned or categorized. Categories can correspond to the status of the resource or to a predicted performance level of the resource. In other words, the deviating resource may be associated with a category corresponding to a status or predicted performance level of the resource. Non-limiting examples of categories can include, favored, disfavored, available, unavailable, performing strongly, performing above-average, performing at baseline, and performing below-average. For example, a degraded resource can be marked as unavailable. Binning a degraded resource can include removing the resource from the pool of resources that are available for the customer to use. As another example, the degraded resource can be added to a bin or pool of disfavored resources that are only available for the customer to use after the favored resources are exhausted. As yet another example, a strongly performing resource can be added to a pool of favored resources. The service provider can charge a premium for customers to use the favored resources.

At 740, the deviating resource is diagnosed based on customer profile data. As described above, customer usage patterns can be profiled to generate a customer classification or a workload profile associated with the customer or with specific instances launched by the customer. The workload profile can be used to diagnose the deviating resource. For example, if only customers launching memory-intensive instances are rejecting a resource, then the resource may have degraded memory. As another example, if only customers launching network-intensive instances are rejecting a resource, then the resource may have degraded network hardware. As yet another example, if only customers launching network-intensive instances are clinging to a resource, then the resource may have strongly performing network hardware.

At 750, an alert is generated. Alerts can include an email, writing to a log file or database, or displaying a visual indication. The alert may differ based on the status of the resource and the confidence level of the diagnosis. For example, if there is high confidence of a degraded resource, an email can be sent to a system administrator indicating that the resource should be removed from service or further diagnosed. As another example, if there is low confidence of a degraded resource, an indication can be sent to a log file.

As another example, if there is high confidence of a strongly performing resource, an email can be sent to a system administrator indicating that the resource should be examined for potential improvements that can be made to other resources of the distributed environment.

At 760, a report can be generated and stored based on the status of the resource. Storing a report can be beneficial so that a system administrator can observe the health of the resources in the multi-tenant environment.

Figure 8:
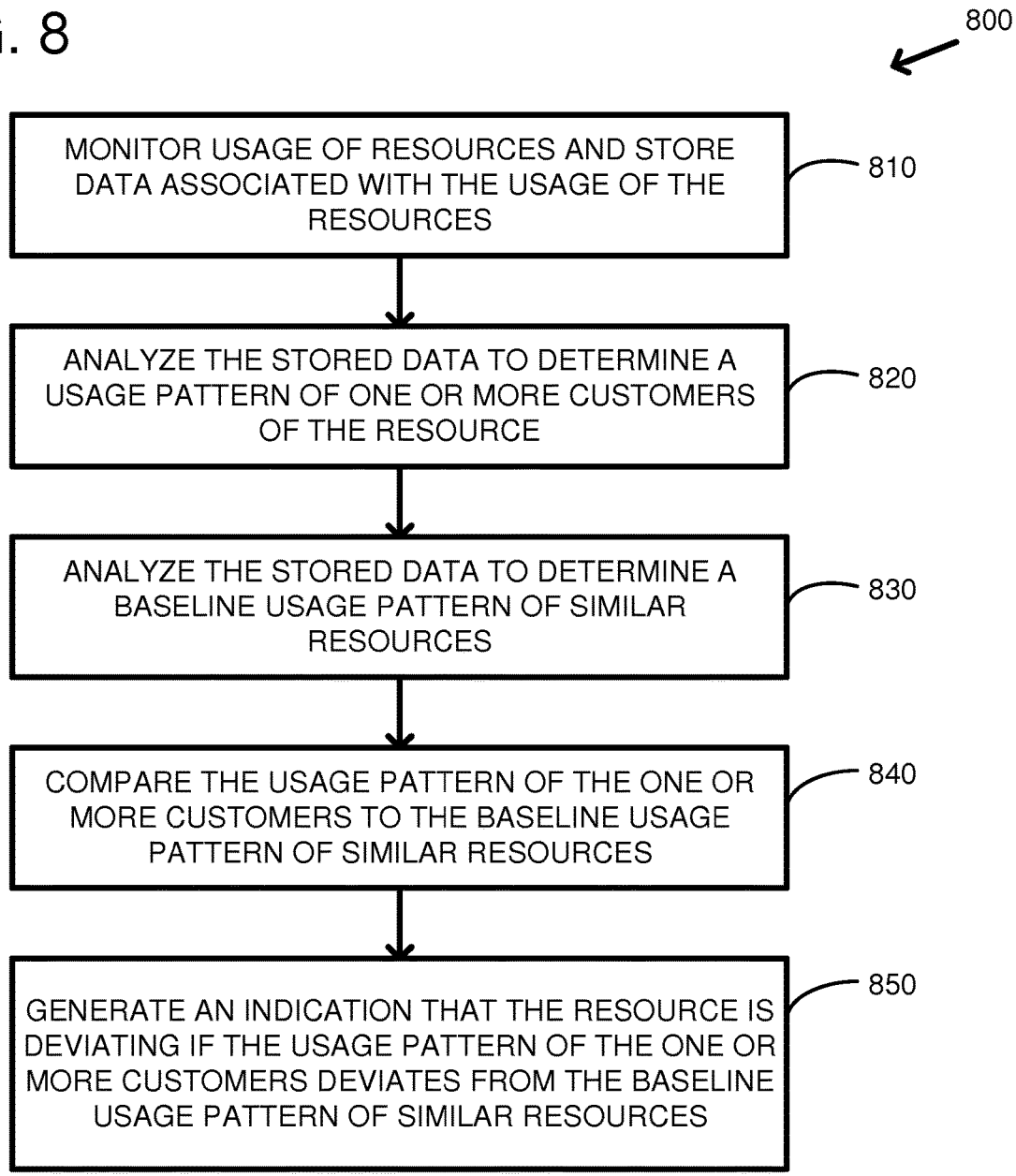
FIG. 8 is a flowchart of a method for detecting a deviating resource of a service provider, according to another embodiment.

FIG. 8 is a method according to another embodiment for detecting a deviating resource of a service provider. At 810, the usage of a resource of the service provider is monitored and data associated with usage of the resource is stored. The resource can be a server computer, a network accessible storage device, or a network device, for example. At 820, the stored data is analyzed to determine a usage pattern of one or more customers associated with the resource. The usage pattern can be a turn-over rate, a disconnect rate, or an abandonment rate of the resource, for example. At 830, the stored data can be analyzed to determine a baseline usage pattern for similar resources. Similar resources can be all resources of a given type, or resources that are at a similar operational point, for example. At 840, the usage pattern of the one or more customers is compared to the baseline usage pattern for similar resources. At 850, an indication that the resource is deviating is generated if the usage pattern of the one or more customers deviates from the baseline usage pattern for similar resources.

Figure 9:
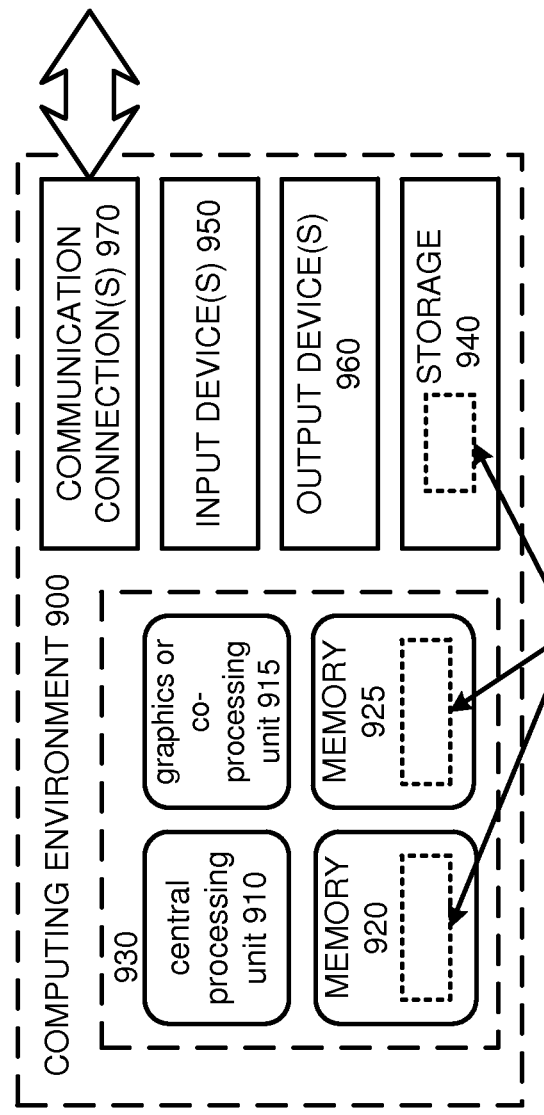
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), a processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method comprising:
    storing customer usage data of a hardware resource of a compute service provider, the hardware resource included in a capacity pool of server computers of the compute service provider, wherein the customer usage data is a measure of customer behavior occurring on the hardware resource;
    analyzing the stored customer usage data to determine a usage pattern of one or more customers associated with the hardware resource, wherein the usage pattern is a measure of repeated customer behavior occurring on the hardware resource and the usage pattern comprises an abandonment rate of virtual machine instances launched on the hardware resource;
    generating an indication that the abandonment rate of the hardware resource is deviating from similar hardware resources of the capacity pool based on a comparison between the usage pattern of the one or more customers associated with the hardware resource and a baseline customer usage pattern for the similar hardware resources of the capacity pool; and
    using the indication that the abandonment rate of the hardware resource is deviating from the similar hardware resources of the capacity pool to remove the hardware resource with the deviating abandonment rate from the capacity pool of server computers of the compute service provider, making the hardware resource unavailable for launching new virtual machine instances.

2. The method of claim 1, wherein the usage pattern is a measure of repeated customer behavior occurring on the resource within a predetermined time interval.

3. The method of claim 1, wherein the usage pattern of the one or more customers is based on how long the resource has been in use.

4. The method of claim 1, further comprising profiling customer workloads to generate a workload profile, and using the workload profile to diagnose the resource with the deviating abandonment rate.

5. The method of claim 1, wherein the baseline usage pattern is a measure of repeated customer behavior occurring on similar types of resources within a predetermined time interval.

6. The method of claim 1, further comprising marking the resource with the abandonment rate as unavailable to customers.

7. The method of claim 1, further comprising classifying customers based on the customer usage data, and wherein a customer classification is used to detect the resource with the deviating abandonment rate.

8. A computer-readable storage medium including instructions thereon for executing a method for detecting a deviating resource of a multi-tenant computing environment, the method comprising:
    monitoring tenant usage of a resource of a pool of hardware resources of the multi-tenant computing environment to determine a tenant usage pattern of the resource, wherein monitoring the tenant usage of the resource includes monitoring tenant actions associated with the resource, and the tenant usage pattern includes a measure of repeated customer actions occurring on the resource including an abandonment rate of the resource;
    determining whether the abandonment rate of the resource is deviating from an abandonment rate of similar resources of the pool based on the tenant usage pattern of the resource; and
    removing the resource from the pool of hardware resources of the multi-tenant computing environment based on the determination that the abandonment rate of the resource is deviating from the abandonment rate of the similar resources of the pool, making the resource unavailable for launching new virtual machine instances.

9. The computer-readable storage of claim 8, wherein determining whether the abandonment rate of the resource is deviating from the abandonment rate of the similar resources of the pool includes comparing the tenant usage pattern of the resource to a baseline usage pattern for the similar resources of the pool.

10. The computer-readable storage of claim 9, the method further comprising generating an indication that the resource is deviating from the similar resources of the pool if the tenant usage pattern deviates from the baseline usage pattern for the similar resources of the pool.

11. The computer-readable storage of claim 8, the method further comprising determining a confidence level in the determination that the abandonment rate of the resource is deviating from the abandonment rate of the similar resources of the pool and marking the resource as unavailable for launching new compute services if the resource is degraded and the confidence level exceeds a confidence threshold.

12. The computer-readable storage of claim 8, wherein the resource is a server computer and the abandonment rate of the resource is based on an abandonment rate of virtual machine instances launched on the server computer.

13. The computer-readable storage of claim 8, wherein the resource is a network accessible storage device and the abandonment rate of the resource is based on a disconnect rate of the network accessible storage device.

14. The computer-readable storage of claim 8, wherein the tenant usage pattern is based on how long the resource has been in use.

15. The computer-readable storage of claim 8, the method further comprising profiling tenant workloads to generate a tenant classification, and using the tenant classification to diagnose the resources of the pool.

16. The computer-readable storage of claim 8, wherein the tenant usage pattern of the resource is based on a plurality of tenants.

17. The computer-readable storage of claim 8, further comprising categorizing the resource based on the tenant usage pattern of the resource.

18. The computer-readable storage of claim 17, wherein the resource is categorized as favored based on the tenant usage pattern of the resource deviating from a baseline usage pattern of similar resources of the pool.

19. A system for detecting a deviating hardware resource of a multitenant environment of a compute service provider, comprising:
   a plurality of computing resources;
   a metrics database;
   a resource monitoring service configured to monitor customer usage of the plurality of hardware computing resources and to store customer usage data on the metrics database, wherein the customer usage data is a measure of customer behavior occurring on the plurality of hardware computing resources;
   a profiling service configured to analyze the stored customer usage data to determine a customer usage pattern of a resource of the plurality of hardware computing resources, wherein the customer usage pattern is a measure of repeated customer behavior occurring on the resource, and the customer usage pattern comprises an abandonment rate of the resource; and
   a health monitoring service configured to compare the customer usage pattern of the resource to a baseline customer usage pattern for similar resources of the plurality of hardware computing resources and generate an indication that the-abandonment rate of the resource deviates from an abandonment rate of the baseline customer usage pattern for similar resources of the plurality of hardware computing resources; and
   an instance manager service configured to use the indication that the abandonment rate of the resource is deviating to exclude the resource from the plurality of hardware computing resources in response to a request received by the compute service provider, making the resource unavailable for launching new virtual machine instances.

20. The system of claim 19, wherein the resource of the plurality of computing resources is a server computer and the abandonment rate of the resource is based on an abandonment rate of virtual machine instances launched on the server computer.

21. The system of claim 19, wherein the resource of the plurality of computing resources is a network accessible storage device and the abandonment rate of the resource is based on a disconnect rate of the network accessible storage device.

* * * * *